No. 623,759. Patented Apr. 25, 1899.
W. M. BAKER.
HARROW.
(Application filed Jan. 6, 1899.)
(No Model.)
FIG. 1.
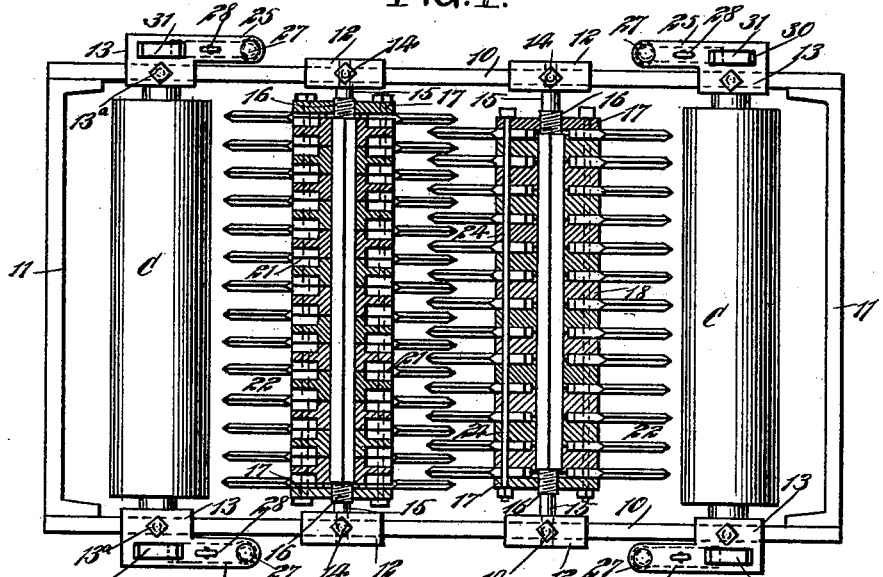
FIG. 2.
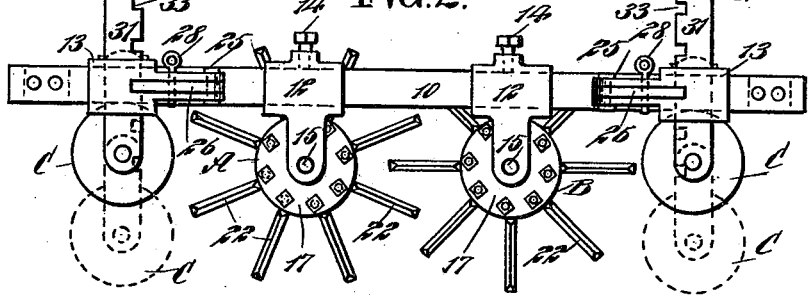
FIG. 3. FIG. 4. FIG. 5.
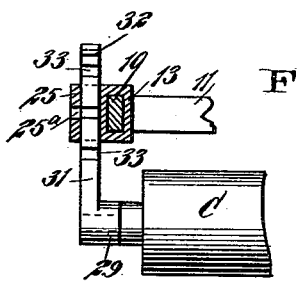
WITNESSES:
INVENTOR
William M. Baker
BY
ATTORNEYS.
THE NORRIS PETERS CO., PHOTO-LITHO., WASHINGTON, D. C.

UNITED STATES PATENT OFFICE.

WILLIAM M. BAKER, OF FORTVILLE, INDIANA.

HARROW.

SPECIFICATION forming part of Letters Patent No. 623,759, dated April 25, 1899.

Application filed January 6, 1899. Serial No. 701,341. (No model.)

*To all whom it may concern:*

Be it known that I, WILLIAM M. BAKER, of Fortville, in the county of Hancock and State of Indiana, have invented a new and useful Improvement in Harrows, of which the following is a full, clear, and exact description.

The object of my invention is to provide a harrow in which a series of revolving teeth may be employed in connection with rollers, and, further, to provide a means whereby should any one of the teeth become unfitted for use or broken such tooth may be readily removed and replaced by another.

A further object of the invention is to provide a means whereby the depth to which the teeth shall enter the ground may be regulated through the instrumentality of plain rollers and to provide a simple device for adjusting the rollers, said device being capable of ready and convenient adjustment.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the frame of the harrow and the rollers carried by the frame, the toothed drums or rollers being in horizontal section. Fig. 2 is a side elevation of the improved harrow. Fig. 3 is a vertical section through one side bar of the harrow-frame, illustrating one of the bearings for a roller in position on the frame. Fig. 4 is a face view of one of the disks adapted to receive a tooth, and Fig. 5 is a partial vertical section through two of the disks shown in Fig. 4 and likewise a vertical section through a tooth held between the disks and a side elevation of a portion of a locking-bar for the harrow.

The frame of the harrow consists of two parallel side bars 10 and end bars 11, the end bars 11 being detachably secured to the side bars in order that bearings 12, adapted to receive the trunnions of toothed drums or rollers A and B, may be adjustably secured on the side bars of the frame, the said bearings 12 being provided with transverse openings, through which the side bars pass. The side bars are further adapted to receive bearings 13, adjustably secured thereto by set-screws 13$^a$, said bearings having openings also produced therein, through which the side bars pass, and the bearings 13 are located near each end of each side bar. The said bearings 13 are adapted to receive the trunnions of plain rollers C. The toothed rollers or drums A and B are located between the plain rollers C, as is shown in Figs. 1 and 2. The bearings 12 for the toothed rollers or drums may be secured in position upon the side bars of the frame through the medium of set-screws 14, passed through the upper surfaces of the said bearings to an engagement with the upper surface of the side bars, as is particularly shown in Fig. 2.

Corresponding bearings 12 are adapted to journal the ends of shafts 15, and each shaft 15 adjacent to its journaled end is provided with an exterior screw-thread 16, and between the screw-threads 16 each shaft 15 is rectangular or polygonal in cross-section. A disk 17 is located upon each threaded end of each shaft 15, the disks 17 being adapted to act as clamping-disks, since they serve to bind together a series of intermediate disks 18, the intermediate disks 18 being provided with central openings 19, corresponding in contour to the cross-sectional shape of the body portions of the shafts 15, as shown in Fig. 4. Each intermediate disk 18 is provided upon both of its side faces with a series of radial slots or grooves 20, the side walls of which slots or grooves are parallel, as shown in Fig. 4, with the exception of the bottom portion of the slots or grooves, which portions are somewhat V-shaped or angular, as is also shown in Fig. 4, and the slots or grooves 20 in the intermediate disks are separated by V-recesses 21. (Shown in Fig. 4.) The various grooves or slots 20 are adapted to receive one end of the harrow-teeth 22; but the entrance ends of the harrow-teeth are of such thickness that the opposing grooves or channels 20 of two opposite or adjacent disks 18 are necessary to fully receive the entrance ends of said teeth. The entrance ends of the teeth are pointed and somewhat flattened in order that they may neatly fit into the grooves 20. The body portions of the teeth 22, however, are polygonal or rectangular in cross-section, and their outer ends are beveled at one or at opposite sides, as may be found desirable.

In the arrangement or construction of one of the toothed drums or rollers a clamping-disk 17 is placed upon the threaded portion 16 of a shaft 15, the inner face of each of the said clamping-disks being correspondingly formed to the side faces of the intermediate disks. The first set of teeth is placed in the grooves or slots 20 of the clamping-disk that is placed in position. An intermediate disk is then placed upon the shaft and is carried to an engagement with the clamping-disk, receiving also the shank ends of the first row of teeth 22. A second set of teeth is then placed in the slots or grooves 20 at the outer side of the intermediate disk, and a second intermediate disk is placed upon the shaft, receiving the shanks of the teeth between it and its mating disk, and in this manner the intermediate disks and teeth are placed upon the shaft until practically the opposite threaded surface 16 is reached, whereupon the second clamping-disk 17 is placed in position on the shaft and screwed up until the intermediate disks are held firmly and closely together and between the two clamping-disks 17. Each tooth at its shank end or the end that enters the slots in the disks 17 and 18 is provided with a transverse groove, and the various disks 17 and 18 are provided with apertures 23, arranged to correspond in position to the position of the grooves in the teeth when the teeth have been properly placed between the disks. When the teeth have been thus placed between the disks, the slots of the teeth in the same horizontal line will be in registry, and the clamping-disks are strengthened and likewise the intermediate disks, and the teeth are held in position between the various disks by passing rods 24 through the clamping-disks and the apertures 23 in the intermediate disks and through the registering grooves in the same line of teeth, as is shown in Figs. 1 and 5. These rods are provided, preferably, with heads at one end and with nuts at their opposite ends. When the two roller-harrows are in position in the frame, the teeth of one roller enters the space between the teeth of the opposing roller, as shown in Fig. 1.

The end bearings 13, adapted to receive the trunnions of the plain rollers C, are provided at their upper and at their outer faces with horizontal projections 25, the projections being in direction of the center of the side pieces, yet being located at the exterior of the side pieces 10 of the frame. Each extension 25 of each bearing 13 is provided with a longitudinal horizontal slot 25ª, in which a latch 26 is mounted to swing, the latches being pivoted to the extensions at their inner ends by suitable pivot-pins 27. The latches are held within the extensions of the bearings 13 by pins 28 or their equivalents, passed through the extensions of the bearings and through the latches 26.

The bearings 13 may be properly termed "boxes," since they do not directly receive the trunnions of the rollers C, each box being provided with a slot 30, adapted to receive a vertical arm 31, having a sleeve 29 formed at its lower end to receive a trunnion of a roller C, as illustrated in Fig. 3. Each arm 31, which may be termed a "hanger-arm," is provided with a cap 32, which prevents the arm from being drawn through the box 13, in which it is mounted to slide when the arm is drawn downward, and each hanger-arm 31 is provided, preferably at its inner longitudinal edge, with a series of recesses 33, and the latches 26, carried by the boxes 13, are adapted to enter any one of the recesses 33, so as to hold the hanger-arms 31 in an adjusted upper or lower position, as may be required.

The teeth of the toothed rollers or drums enter the ground more or less deeply, according to the upper or lower adjustment of the hanger-arms carrying the rollers C, as indicated in Fig. 2.

Having thus described my invention, I claim as new and desire to secure by Letters Patent—

1. In a harrow, a frame, toothed rollers laterally adjustable upon the frame, plain rollers between which the toothed rollers are located, boxes laterally adjustable upon the frame, hangers for the plain rollers, vertically adjustable in the boxes, and locking devices for the hangers, as set forth.

2. In a toothed harrow-roll, a clamping-disk provided with radially-disposed grooves in a side face, adapted to receive the shanks of teeth, and apertures extending into the side portions of the grooves, adapted to receive keys for the teeth, as specified.

3. In a harrow, a frame, toothed rollers laterally adjustable upon the said frame, the teeth of one roller being adapted to enter the spaces between the teeth of the opposing roller, boxes adjustable upon the frame near its ends, each box being provided with an extension, a latch, and a locking device for the latch, a hanger having vertical movement in each of the said boxes, the hangers being provided with keepers for the reception of the said latches, and plain rollers journaled in the said hangers, the toothed rollers being located between the plain rollers, as set forth.

4. In a harrow, a shaft having a polygonal body and a threaded exterior surface near each end, the extremities of the shaft being adapted to turn in bearings, clamping-disks located upon the threaded surfaces of the shaft, and intermediate disks mounted upon the body portion of said shaft, the intermediate disks being provided with corresponding radial grooves in both faces, and the clamping-disks having grooves in their inner faces corresponding to the grooves in the faces of the intermediate disks, teeth having their shanks introduced into opposing grooves in the various disks, and key-rods passed through the several disks and through recesses in the teeth carried by the disks, for the purpose set forth.

5. In a harrow, the combination, with a shaft having a polygonal body and a threaded surface near each of its ends, the ends of the shaft being adapted to turn in bearings, and clamping-disks located upon the threaded surfaces of the shaft, the clamping-disks being provided with radial grooves in their inner faces, said grooves being provided with parallel side walls and a V-shaped bottom, of disks intermediate of the clamping-disks and loosely mounted on the body of the shaft, each intermediate disk being provided with corresponding grooves in each of its side faces, the grooves in the intermediate disks corresponding to the grooves in the inner faces of the clamping-disks, teeth having their inner ends flattened and pointed, said teeth being received within the grooves of opposite disks, and key-rods passed through openings in all of the disks and through recesses in the said teeth, and means for tightening the said key-rods, as and for the purpose set forth.

WILLIAM M. BAKER.

Witnesses:
F. W. BREWSTER,
A. H. THOMAS.